No. 667,649. Patented Feb. 5, 1901.
P. E. COLLINS.
TYPE WRITER.
(Application filed May 21, 1900.)
(No Model.) 4 Sheets—Sheet 1.

Fig. 1.

Witnesses
Jas. McAloncy.
Nancy P. Ford.

Inventor
Paul E. Collins
by J. P. and S. S. Livermore
Attys.

No. 667,649. Patented Feb. 5, 1901.
P. E. COLLINS.
TYPE WRITER.
(Application filed May 21, 1900.)
(No Model.) 4 Sheets—Sheet 2.

No. 667,649. Patented Feb. 5, 1901.
P. E. COLLINS.
TYPE WRITER.
(Application filed May 21, 1900.)
(No Model.) 4 Sheets—Sheet 3.

Witnesses
Jas. J. Maloney.
Nancy P. Ford.

Inventor,
Paul E. Collins.
by J. Paul & H. Livermore
Att'ys

THE NORRIS PETERS CO., PHOTO-LITHO., WASHINGTON, D. C.

No. 667,649. Patented Feb. 5, 1901.
P. E. COLLINS.
TYPE WRITER.
(Application filed May 21, 1900.)
(No Model.) 4 Sheets—Sheet 4.

Witnesses
Jas. J. Maloney.
Nancy P. Ford.

Inventor
Paul E. Collins
by J. P. and J. P. Livermore
Attys.

UNITED STATES PATENT OFFICE.

PAUL E. COLLINS, OF BOSTON, MASSACHUSETTS, ASSIGNOR OF TWO-THIRDS TO LYMAN H. ATKINS, OF SAME PLACE, AND HENRY A. CLIFFORD, OF MEDFORD, MASSACHUSETTS.

TYPE-WRITER.

SPECIFICATION forming part of Letters Patent No. 667,649, dated February 5, 1901.

Application filed May 21, 1900. Serial No. 17,459. (No model.)

*To all whom it may concern:*

Be it known that I, PAUL E. COLLINS, of Boston, county of Suffolk, and State of Massachusetts, have invented an Improvement in Type-Writers, of which the following description, in connection with the accompanying drawings, is a specification, like letters on the drawings representing like parts.

The present invention relates to a type-writing machine and is embodied in attachments whereby the carriage may be restored by foot-power at the end of each line, there being also devices whereby the position at which the carriage is arrested is automatically determined, the appliance being shown as provided with a treadle so arranged that by shifting the position of the foot in operating the same the carriage may be completely restored or stopped at the five-space, ten-space, or any predetermined position other than that of the marginal position. The restoring device is so arranged that the carriage is released therefrom automatically substantially when it reaches the position to which it is to be restored, so that it is impossible for the carriage to bring up with a slam, while the carriage is free to travel forward in the writing of a line without removing the foot from the operating-treadle, which is so arranged that it can be restored to its initial position at any time during the writing of a line and will then automatically become engaged with the carriage, so that the proper movement of the foot will restore the said carriage when desired.

The invention further relates to devices of novel construction whereby the carriage can be jumped forward a number of spaces at a time by touching the release-key or its equivalent, the said carriage being provided with fixed stops at any desired distance apart, usually a distance equal to five spaces, and the release-key is arranged to throw a movable stop secured to the frame of the machine into the path of the stops on the carriage, so that the said carriage will be arrested by the coöperation of the said stops. The release-key or equivalent actuating device for releasing the feed mechanism is further arranged to be in convenient position to be operated, and the machine may be provided with a pair of engaging surfaces, one on the carriage and one on the type-writer frame, so arranged as to be both engaged by the finger of the operator when moving the release-key, so that the finger while engaging and remaining stationary with relation to one surface will engage and travel along the other surface, thereby constituting a brake to prevent too rapid a movement of the carriage. In conjunction with this feature of the invention the machine may be provided with a type-wheel, the periphery of which is adapted to be thrown against the paper on the platen-roll, so as to be rotated in the travel thereof, to print a series of dots or dashes or, if desired, a complete word.

A further feature of the invention consists in a tabulating arrangement preferably employed in conjunction with the foot-power carriage-restoring device, so that the carriage may be stopped at any of a number of predetermined positions, one space apart, for convenience in setting down a column of figures in which it is desired that the units should be in the same column and the tens, hundreds, thousands, &c., properly arranged with relation thereto. In accordance with the invention the tabulating devices comprise a number of stops attached to the frame of the machine and provided with actuating devices, such as additional keys on the keyboard, whereby they may be selectively moved into position to coöperate with a stop on the carriage. The said stop on the carriage may be in the form of a latch, so that in the restoring movement of the carriage it will pass the frame-stop, while in the forward movement of the carriage it will be arrested thereby, so that if the said carriage is restored to a predetermined position after the said stop has been operated and the carriage then released from the feeding mechanism it will travel forward until arrested by the said stop in the desired position. In conjunction with this device the carriage is provided with means for keeping it disengaged from the ordinary feed-controlling devices until it is engaged by one of the said stops, after which the operation of one of the printing-keys will cause the feed mechanism to become reëngaged with the carriage, so that the machine is in operative condition. The movable stops which determine the position at which the carriage is arrested are preferably provided with locking devices, whereby they are maintained in position, the said locking devices being arranged to be unlocked by the operation of any of the type-key levers, so that as soon as one of the said type-key levers is operated the carriage will be free to move in the ordinary way.

While the devices embodying the invention may be modified so as to be readily applied to various types of machines without departing from the essential features of the invention, they are herein shown as applied to and especially arranged for the well-known Remington No. 2 type-writer.

Figs. 13 and 14 are details showing the type-wheel hereinbefore referred to.

Figure 1:
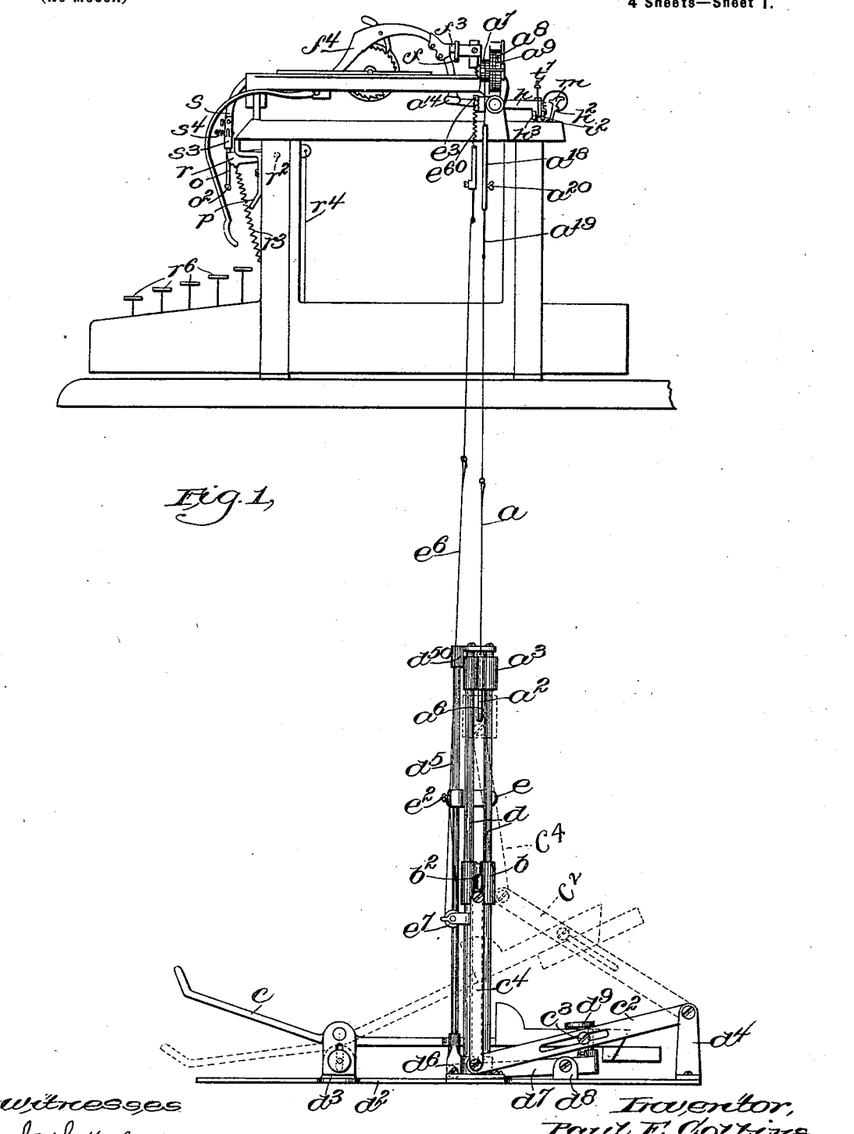
Figure 1 is a side elevation of the carriage-restoring device embodying the invention shown in conjunction with a type-writer, some of those portions of the machine which are non-essential to this invention being omitted.

The type-writer carriage is adapted, in accordance with the present invention, to be restored through the agency of a cord or flexible connecting member $a$, adapted to be connected with an actuating member $b$, arranged to be moved by means of a treadle or foot-lever $c$. The said member $b$ is shown as vertically movable upon a guide-support $d$, consisting of a pair of vertical rods mounted on a base $d^2$, which is arranged to be secured to the floor below the type-writer, the said base also being provided with lugs $d^3$, in which the treadle $c$ is pivoted. The said treadle $c$ is shown as adapted to move the member $b$ through the agency of a slotted link $c^2$, pivoted in a lug or projection $d^4$ on the base-piece $d^2$, the treadle $c$ having a projection $c^3$ engaging the walls of the slot in the link $c^2$, so that when the treadle is moved on its pivot it will correspondingly move the link $c^2$, which is connected by means of a link $c^4$ with the member $b$, so that the said member is raised, as shown in dotted lines, Fig. 1.

Figure 2:
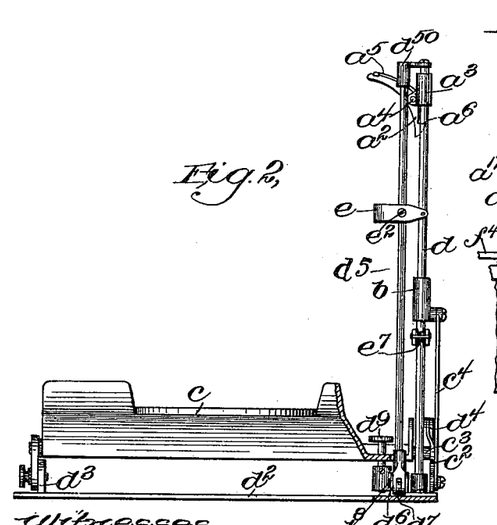
Fig. 2 is a front elevation, partly in section, of the carriage-restoring device detached from the type-writer.

In order that the reverse or downward movement of the member $b$ may be transmitted to the cord $a$, and thereby restore the type-writer carriage, the said cord $a$ is arranged to be automatically connected with the member $b$, the said cord being herein shown as provided with a latch $a^2$, arranged to engage a shoulder $b^2$, formed in the member $b$, the said latch $a^2$ being mounted on a support $a^3$, arranged to travel upon the guide-rods $d$. The said latch $a^2$ is shown as pivotally supported at $a^4$ and normally held in the position shown in Fig. 2 by means of a spring $a^5$, so that when the member $b$ moves toward the said latch the latter will be engaged thereby and pressed out of the way until the latch projection or shoulder $a^6$ comes in line with the shoulder $b^2$, when said shoulder $a^6$ will drop into place to thereby connect the said members.

Since the type-writer carriage in its forward or operative movement is controlled by the carriage-feeding devices, it is obvious that the treadle $c$ may be rocked at any time during the writing of a line to connect the cord with the actuating member $b$, so that the operator can restore the carriage immediately upon the completion of a line.

In order to disconnect the carriage from the restoring device when the said carriage has been restored to the desired position, the latch $a^2$ is arranged to be tripped at the proper time, the tail of the said latch being herein shown as adapted to be engaged by a projection or tripping-shoulder $e$, shown as mounted on a supplemental rod $d^5$, vertically movable in a bearing $d^{50}$, connected with the guide-support $d$.

In ordinary writing it is necessary, of course, at the beginning of a paragraph to start a new line at a space other than the marginal position, the five-space or ten-space ordinarily being used. In order that the carriage may be arrested at such predetermined space, the restoring mechanism in accordance with the present invention is provided with means for disconnecting the actuating member $b$ from the cord $a$ before the carriage has reached the marginal position, so that the said carriage will come to a stop at the desired position. This is accomplished, as herein shown, by shifting the position of the tripping-shoulder $e$, which for this purpose is vertically movable, the supporting-rod $d^5$, upon which it is mounted, being connected at $d^6$ with a supplemental lever $d^7$, pivoted in lugs $d^8$ and having a projection $d^9$, adapted to be engaged by the foot of the operator in pressing the treadle to restore the carriage. The said projection $d^9$ extends through an opening in the treadle $c$ and is near one side thereof, so that in the ordinary operation it will not be engaged by the operator's foot, but will be so engaged if the foot is moved toward the edge of the treadle before operating the same. If the said engaging portion $d^9$ is engaged by the foot, it is obvious that the projection $e$ will be moved upward, so that the latch $a^2$ will be tripped before the carriage is completely restored.

Figure 12:
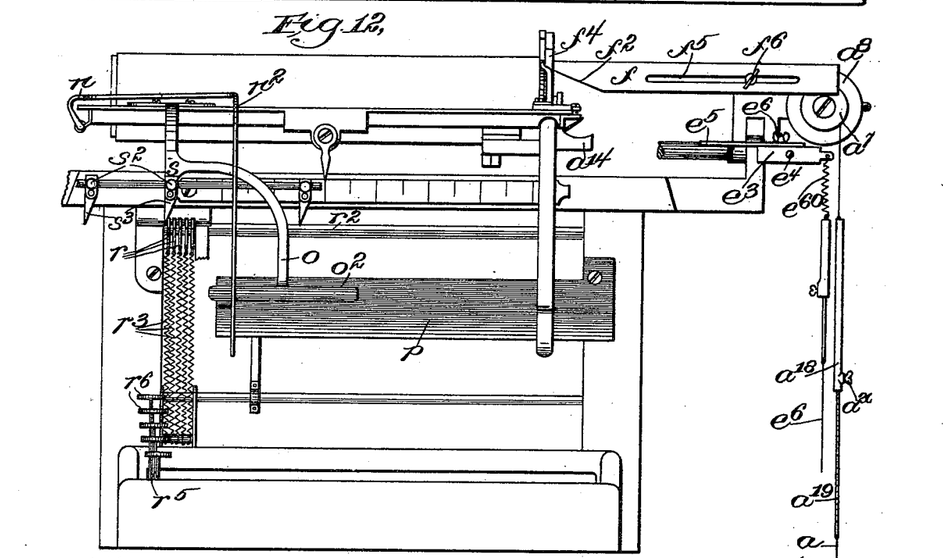
Fig. 12 is a partial front elevation.

The engaging projection $e$ is shown as secured to the rod $d^5$ by means of a set-screw $e^2$, so that it can be adjusted along the said rod and can be set so as to stop the carriage at any desired position. In order to prevent the carriage from traveling by momentum after the cord $a$ has been disconnected past the position at which it is desired to begin a new line, the device is shown as provided with a movable stop $e^3$, pivotally supported at $e^4$, Fig. 12, and having a projecting portion $e^5$, adapted to engage a portion of the carriage when the said stop is rocked on its pivot. The said stop is arranged to be rocked on its pivot in response to the movement of the supplemental lever $d^7$, so that its action is coöperative with that of the projection $e$. To this end the said stop is shown as connected by a cord $e^6$ with the projection $e$, the said cord passing over a fixed pulley $e^7$, so that the upward movement of the projection $e$ in response to the movement of the lever $d^7$ will throw up the projection $e^5$ and cause the same to engage and arrest the carriage. As the pivotal support $e^4$ of the stop is bodily lifted each time the carriage is lifted to inspect the writing, a spring $e^{60}$ is shown as interposed between the stop and its cord $e^6$ to permit such movement without straining the cord. The projection $e^5$ is also longitudinally adjustable with relation to its supporting-rod, as by a set-screw $e^6$.

As herein shown, the cord $a$ is not directly connected with the carriage, but is secured to the periphery of a pulley $a^7$, connected and mounted coaxially with a larger pulley $a^8$, which has a supplemental cord $a^9$ connected with its periphery and with the carriage. By this construction the movement of the carriage is multiplied, so that a comparatively small movement of the treadle will move the carriage a sufficient distance.

It is desirable in the restoring movement of the carriage to disconnect the feed-rack from the feed-dogs which control the feed movement thereof, and the arrangement is herein shown as such that a pull upon the cord to restore the carriage will lift the feed-rack connected therewith out of engagement with the feed-dogs, as the said feed-rack is ordinarily lifted by the hand-lever commonly used for restoring the carriage. This is accomplished by connecting the supplemental cord $a^9$ with a lever $a^{10}$ pivoted at $a^{12}$ upon a portion of the carriage and having a tailpiece or projection $a^{13}$, arranged to engage the finger-piece $a^{14}$, which lifts the feed-rack. The said lever $a^{10}$, is shown as acted upon by springs $a^{15}$ and $a^{16}$, the stress of which is adapted to be overcome by the first pull upon the cord $a^9$, so that the rack is lifted before the carriage begins to move in response to the further movement of the said cord.

Figure 3:
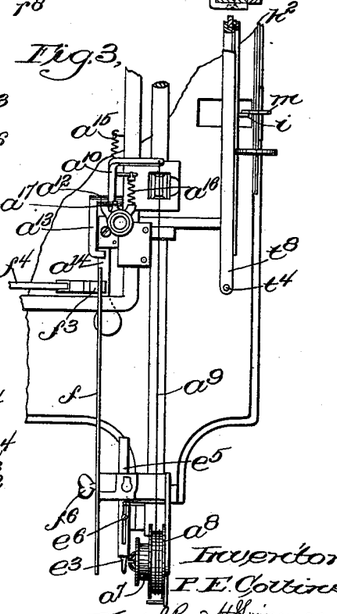
Fig. 3 is a detail showing in top plan view a portion of the type-writer and illustrating the means for connecting the restoring device with the carriage.

To shift the paper-platen, the attachment is provided with a projection $f$, having an inclined or cam surface $f^2$ arranged to extend over a projection $f^3$, shown as secured to the ordinary hand operating-lever $f^4$, which is arranged by its movement to shift the platen in the usual manner. As the carriage is restored, therefore, the projection $f^3$ rides under the inclined surface $f^2$, thus depressing the lever $f^4$, and thereby turning the platen. The said projection $f$ is shown as provided with a slot $f^5$ and is secured by a thumb-screw $f^6$, Figs. 3 and 12, whereby it may be adjusted longitudinally, this being desirable in some cases, since in setting down figures, for example, the carriage may only be moved a short distance each time it is restored, and it therefore becomes necessary to so adjust the said projection that the projection $f^3$ will pass out of engagement therewith in the forward movement of the carriage in order to be operatively engaged thereby in the return movement.

It will be seen from the foregoing description that the carriage may be restored either to its marginal position or to any desired space, it being necessary, however, that the parts should be adjusted so as to determine the space at which the carriage will be arrested when it is not moved completely to the edge. It is obvious, however, that the supplemental lever $d^7$ and its connected parts might be duplicated, so that the carriage could be restored to any of a number of predetermined positions. Ordinarily, however, this device will be used merely for letter-writing and the like, in which all the indented lines will be uniform.

It is sometimes desirable for certain kinds of tabulating work after the carriage has been moved to its marginal position or to an intermediate position to permit the forward movement thereof a greater distance than one space at a time, and the carriage-controlling mechanism is provided in accordance with the present invention with means for jumping the carriage a number of spaces at a time, five spaces being a convenient number, although it is obvious that the parts may be arranged so as to jump the carriage any desired number of spaces. This is accomplished in accordance with the invention by providing the carriage with a number of stops at a certain definite distance apart—five spaces, for example—while the release-key is arranged to throw a projection supported on the frame into the path of the said stops. To this end the carriage-stops $g$ are shown as secured to the pivotally-supported rack-carrier $h$, which is arranged to be lifted in the ordinary way by means of the release-key, so as to become disengaged from the feed-dogs $i$ and $k$ in the usual manner. The coöperating stop $m$ is shown as secured to the fixed dog $i$ and is arranged to be moved into the path of the stops on the rack-carrier when the said rack is lifted. As herein shown, the rack-carrier $h$ is arranged to carry a rod $h^2$, extending along at the back of the projection $m$, the said rod coöperating with an inclined surface $m^2$ on said projection, along which it moves when the rack is lifted, so as to throw the said projection toward the rack. Upon pressing the release-key, therefore, the stops $g$ are moved upward, and at the same time the projection $m$ is moved forward, so that while the rack is released from the feed-dogs the said projection is in position to arrest the carriage as soon as it is reached by one of the stops $g$. When the operator lets go of the release-key, however, the rod $h^2$ will move down along the surface $m^2$ and permit the projection $m$ to move out of engagement with the stop $g$, the same movement carrying the feed-dogs back into engagement with the rack. The carriage can then be fed forward in the ordinary way by operating the key-levers, or it may be caused to jump another group of spaces by again touching the release-key.

In order to prevent the stops $g$ from interfering with the return movement of the carriage in response to the restoring device herein described or the ordinary hand-lever, the stops $g$ are so positioned that when the rack is lifted by the foot-power restoring device or hand-lever it will not be lifted high enough to cause said stops to engage the projection $m$. As herein shown, Fig. 3, the lever $a^{10}$, to which the cord $a^9$ is connected, is adapted to engage a stop $a^{17}$ as soon as the rack is lifted far enough to be disengaged from the dogs. The release-key, on the other hand, is so arranged as to lift the rack slightly higher, and to thereby cause the stops $g$ to coöperate with the stop $m$, the upward movement of the rack by the release-key being limited only by a projection $m^{20}$ at the end of the inclined surface $m^2$.

In conjunction with the means just described for jumping the carriage a number of spaces at a time the machine is provided with means for retarding the movement of the carriage in order to prevent a shock when the said carriage is brought up by the engagement of the stops with each other.

Figure 11:
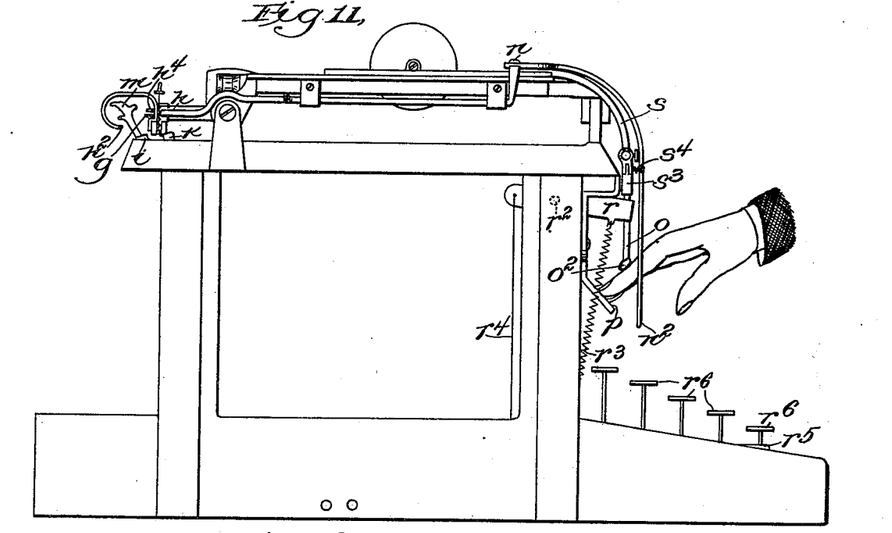
Fig. 11 is a side elevation showing the side of the machine opposite to that shown in Figs. 1 and 4.

As herein shown, the release-key $n$ is provided with an extension $n^2$, projecting downward in front of the frame of the machine, so as to be easily engaged by the finger of the operator, as indicated in Fig. 11. The release-key being shown as the kind used in the Remington machine, it is obvious that a pressure upon the projection $n^2$ in the direction of movement of the carriage will lift the rack and allow the said carriage to travel forward in response to its spring-actuating device until arrested by one of its stops, as described. To retard said movement, the said carriage is provided with a projection $o$ adjacent to the projection $n^2$ and having an engaging portion $o^2$ to engage the finger of the operator, as shown. Adjacent to the said projection $o$ is a surface $p$, secured to the type-writer frame in such position as to be also engaged by the finger of the operator, which travels along the said surface as the carriage moves. The engaging portion $o^2$ of the projection $o$ is shown as coated with rubber or similar substance, so that it will cling to the finger, the movement of the carriage thus being under control of the operator, who can retard the same by exerting greater or less pressure upon the surface $p$.

The tabulating mechanism hereinbefore referred to as forming a feature of the invention comprises a number of stops each having a key or other suitable actuating device, the said stops being arranged to respectively arrest the carriage in one of a number of different positions separated by a single space. These stops are arranged to arrest the carriage in its forward movement and coöperate with means for releasing the said carriage from the feed-dogs and allowing it to move forward in response to its spring until it is arrested by one of the said stops. These devices are mainly intended for use in setting down columns of figures, in which the units are all set in a single column one below another, and the tens, hundreds, thousands, &c., one, two, three, &c., spaces back of the tens.

The movable stops $r$ are herein shown as pivoted at $r^2$ on the front members of the frame and normally held out of the path of the carriage by means of springs $r^3$. The said stops are connected, as by wires $r^4$, with key-levers $r^5$, each provided with a key $r^6$, so that one of said stops can be thrown upward into the path of one of the stops $s^3$, secured to the stop-carrier $s$. The carriage is suitably set to stop at a certain place by disconnecting the restoring device, as has already been described. The arrangement is preferably such that the stopping-place is somewhere near the middle of the sheet, and the cord $a$ is shown as made in two parts $a^{18}$ and $a^{19}$, whereby the length thereof may be adjusted, the part $a^{18}$ being shown as a sleeve and part $a^{19}$ as a rod adapted to be secured in any desired position therein, as by a set-screw $a^{20}$.

As has been stated, it is necessary that the feed-rack should be disconnected from the feed-dogs in the operation of the tabulating device in order that the carriage upon being restored and released may travel forward in response to its actuating-spring to the selected position. For this purpose the feed-rack is provided with an engaging portion the surface of which is below the edges of the teeth, the said engaging portion extending some distance along the said rack and being adapted to engage the loose dog and prevent the same from engaging the rack. The said engaging portion or "feed-dog-controlling device," as it may be called, terminates at a point on the rack corresponding to the space where the units are to be set, the surface of the extension being at this point inclined toward the rack, so that as the carriage moves forward the loose dog will at this point come into engagement with the rack-teeth. If, therefore, the carriage is restored to a position beyond the space which has been selected for the units-column and then released, it will drop back to the said units-column unless it is arrested by one of the stops controlled by the keys on the keyboard, as has already been described.

The controlling device may be adjustably secured to the rack in order that different spaces may be selected for the units-columns, and the stops $s^3$ may be adjustably secured to the stop-carrier, as by set-screws $s^2$, in order that the position of the stops may be varied to correspond with that of the dog-controlling surface aforesaid. Assuming, therefore, that it is desired to print the figure "2," for example, and below it the figure "100," the operator, after printing the "2," on restoring the carriage will press one of the keys $r^6$ corresponding to the stop, which will arrest the carriage three spaces back of the normal margin position and the carriage on being released will then move only until arrested by the said stop, so that the figures composing the number "100" will fall in the proper place when struck, the "1" in the hundreds-column and the zeros in the tens and units columns. The keys $r^6$ may be depressed before the carriage is restored, the stops $s^3$ being shown as having inclined or latching surfaces and springs $s^4$ and being adapted to latch past the projections $r$ in the return movement of the carriage, but to engage the same in the forward movement thereof.

Figures 6, 7, 8, 9, 10:
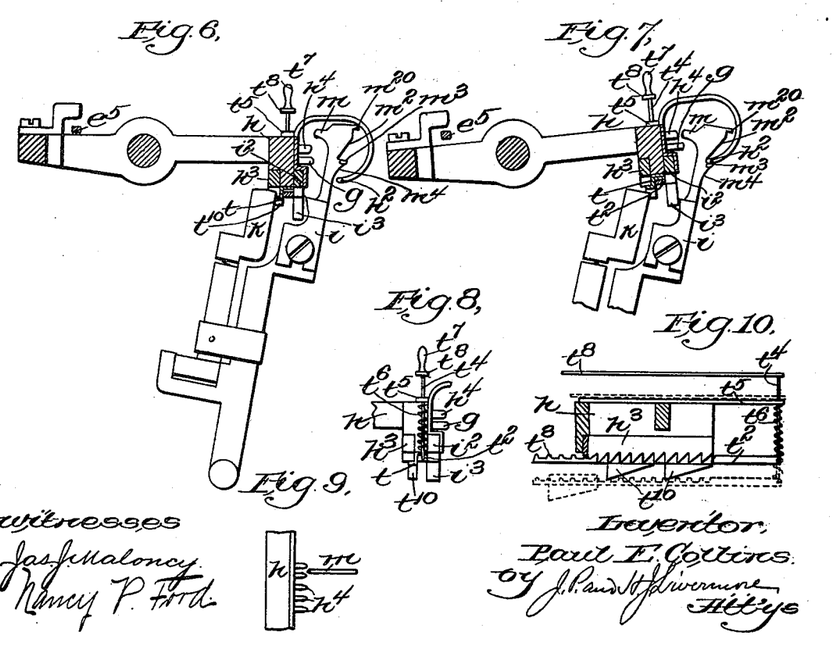
Figs. 6, 7, 8, 9, and 10 are details, on an enlarged scale, illustrating certain features of the carriage-controlling mechanism.

As best shown in Fig. 6, the feed-dog controller $t$ is so arranged as not to prevent the proper engagement of the loose dog $k$ with the feed-rack during its lateral operative movement and, as shown in Fig. 6, extends only partially across the face of the rack, so that in the normal lateral movement of the feed-dog $k$ said dog will move into engagement with the teeth on the rack in the usual way. To attain the proper operation of the fixed dog $i$ and the loose dog $k$, the rack-carrier is provided with a supplemental rack $i^2$ in line with the main rack $h^3$, the said supplemental rack coöperating with the fixed dog $i$, which is prevented from operating with the main rack in the usual way by the presence of the controller $t$, and is therefore separated by some distance from the loose dog and cut away, as shown, to make room for said supplemental rack.

In the normal operation of the device when the feed-rack is down in engagement with the dogs the parts are in the position shown in Fig. 6, and the depression of a key or the space-bar will move the fixed and loose dogs forward, the fixed dog engaging a tooth of the supplemental rack and the loose dog passing out of engagement with the main rack. When the key or space-bar is released, the fixed dog moves backward out of engagement with the supplemental rack and the loose dog moves backward into engagement with the main rack in the usual way, the downwardly-projecting controlling device not preventing the loose dog from engaging a tooth of said rack, since said controlling device is at the back of the rack. When, however, the rack-carrier is lifted, as shown in Fig. 7, the dogs will move back a little farther, (since the loose dog does not then engage the side of the controller, which is lifted above the said dog,) and when the rack-carrier is dropped the controlling device will drop on the loose dog, which then coöperates with the parts $t^{10}$ until again laterally moved by the operation of a key or space-bar.

Since the racks are out of engagement with the dogs when the carriage is arrested by one of the stops on the front of the machine, it is necessary that the said dogs should be in proper alinement with the racks when the first key-lever is depressed in the printing operation in order that the said dogs may properly engage the racks and control the feed movement. This would naturally necessitate a very fine adjustment of the stop on the front of the machine, which would be easily affected by wear, and in order to obviate this necessity the machine is provided with a device for centering or positioning the carriage in response to the movement of the key-lever, so as to insure the proper alinement of the rack-teeth and dogs. For this purpose the rack-carrier is shown as provided with a series of beveled teeth $h^4$, arranged to coöperate with the projection $m$, which has already been described as secured to the fixed dog $i$ and which is also beveled to coöperate with said teeth, as will be described. The said teeth $h^4$ are normally out of line with the projection $m$, and in order that they may be in line therewith when the first key-lever is operated the rack-carrier $h$ is arranged to be supported upon a shoulder $m^3$, formed on the projection $m$ and adapted to support the rod $h^2$, and consequently the teeth $h^4$, in the position shown in Fig. 7. Below the shoulder $m^3$ is an inclined surface $m^4$, which is engaged by said rod as the rack is lifted, so that the rod rides over the same until it rests upon the said shoulder. Assuming, therefore, that the carriage has been restored, released, and arrested by one of the stops $r$, it is obvious that the next movement of the key-lever will produce the usual lateral movement of the dogs, so that the beveled projection $m$ will pass into engagement with one of the teeth $h^4$, which are shown as having inclined edges, Fig. 9, so that the said projection will slightly move the carriage, if necessary, and bring the same exactly in line with the fixed dog $i$, which then engages the rack $i^2$, the said rack having dropped to its normal position because the shoulder $m^3$ has passed out from under the rod $h^2$.

When the centering device above described is employed, it is obvious that the rack, when the carriage is arrested, will be lifted, as shown in Fig. 7, above the feed-dog $i$, so that when the first key-lever is operated, allowing the rack to drop, the said rack may not drop so far that the proper tooth will engage the said feed-dog. To obviate this difficulty, the supplemental rack $i^2$ may be provided at intervals with elongated teeth $i^3$, the said teeth being placed in the positions corresponding to the columns on the scale where it is likely that the units-columns will be wanted when the instrument is to be used for tabulating-work. It is further obvious that when this centering device is employed and the carriage is jumped along by the operation of the release-key, as hereinbefore described, the rod $h^2$, engaging the shoulder $m^3$, will prevent the rack from dropping to its normal position unless one of the key-levers is operated. In order, therefore, to insure that the carriage will be retained by the loose dog $k$ when the release-key is liberated after the carriage has been arrested by one of the stops $g$, a series of supplemental teeth $t^{10}$, analogous to the controlling device $t$, hereinbefore described, are secured to the main rack, the said teeth projecting some distance below said main rack and each being adapted to cover a number of the ordinary teeth equal to the number of spaces which the carriage is to be jumped. As the dogs travel back and the rack drops, therefore, when the release-key is freed, the loose dog will pass under the surface of one of said teeth or controlling devices $t^{10}$ and will slide along the same until it brings up against the next adjacent controlling device.

While it is practicable to keep the finger on the desired key $r^6$ to control the carriage until after the first printing key-lever has been operated, it is desirable to automatically lock the said key $r^6$ and cause the same to be unlocked in response to the movement of one of the printing key-levers, thus leaving both hands free to perform the printing operations. For this purpose the key-levers $r^5$, upon which the keys are supported, are provided with a locking device adapted to hold the said keys depressed, but arranged to be unlocked by the depression of one of the printing key-levers.

Figure 4:
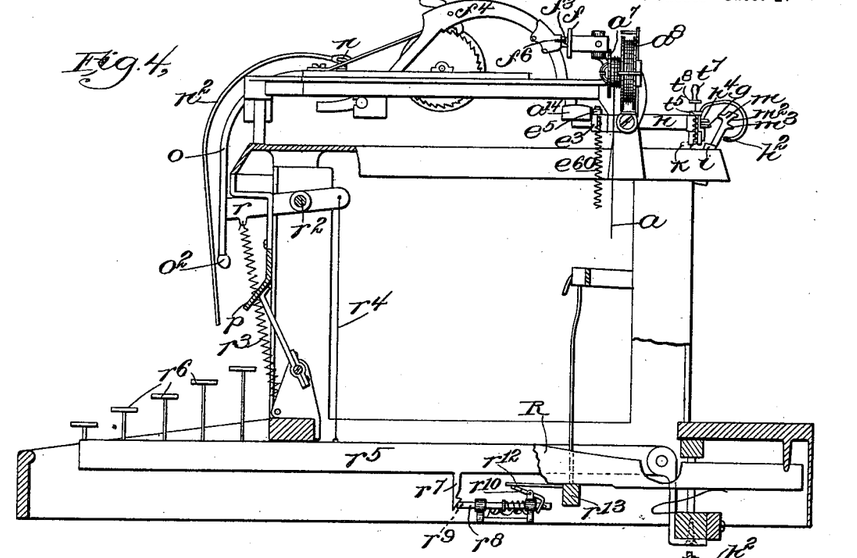
Fig. 4 is a side elevation, partly in section, of a sufficient portion of the type-writer to illustrate certain features of the invention.
Figure 5:
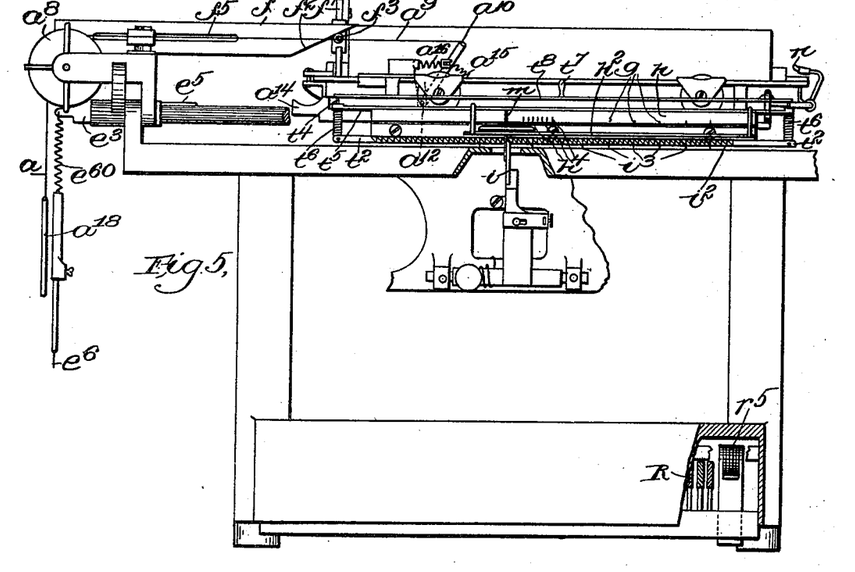
Fig. 5 is a rear elevation, partly in section, of a portion of the type-writer.

As herein shown, each of the key-levers $r^5$ is provided with a hooked projection $r^7$, having a latching surface and shoulder, as shown in Fig. 4, arranged to coöperate with a longitudinally-movable rod $r^8$, having a projection $r^9$, arranged to engage the latching-shoulder aforesaid when the key-lever having the said projection is depressed. To release the said locking device, the rod $r^8$ is arranged to be moved longitudinally by a depression of any of the type key-levers R, the said rod being acted upon by a pivoted lever $r^{10}$, which is engaged by a projection $r^{12}$ from the universal bar $r^{13}$, which extends across under the key-levers for the purpose of actuating the feeding device and restoring the said key-levers to their normal position.

The controlling devices $t^{10}$ are useful apart from the tabulating device above described, since they determine with accuracy the stopping-place of the carriage, so that it is not necessary to let go of the said carriage at exactly the point where it is desired to stop the same, since if the carriage is released at any point beyond the desired position it will not be engaged by the dogs until reaching such position. It is obvious that a number of such teeth may be arranged along the rack at five or ten spaces apart, so that if it is desired, for example, to stop the carriage at the twenty-space it is necessary only to let go of the same after it has reached the twenty-space, but before it has reached the fifteen-space, in order to have it arrested at the said twenty-space. As herein shown, the said teeth are arranged to be placed in any desired position along the main rack and are shown as held in position by means of a bar $t^2$, provided with teeth $t^3$, adapted to engage corresponding teeth formed in the pieces $t^{10}$ and to hold the same in position with relation to the rack, as shown in Fig. 10. The said bar $t^2$ is held in position by rods $t^4$ at its ends, said rods projecting upward through openings in a similar bar $t^5$, secured to the top of the rack-carrier $h$. Springs $t^6$ connect the rods $t^2$ and $t^5$, so as to hold the said rod $t^2$ snugly against the supplemental teeth $t^{10}$, it being obvious that the said teeth can be released by depressing the rod $t^2$, as by a handle $t^7$ on a bar $t^8$, which connects the two rods $t^4$.

Figure 13:
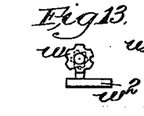
Figure 14:
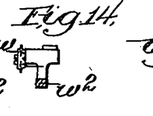

It is desirable sometimes in certain forms of tabulating-work to print a word or the like in one portion of the paper followed by a series of dots and dashes to connect the said word with another word or number on another portion of the sheet. To facilitate this work, the machine may be provided in accordance with the present invention with a printing-wheel $w$, rotatably mounted upon one of the type-bars $w^2$, as shown in Figs. 13 and 14, the axis of said wheel when the same is in printing position being transverse to the direction of travel of the paper-carriage, so that when the periphery of the wheel is engaged by the paper and the carriage moved the said wheel will rotate, thus automatically printing dashes along the sheet. The wheel $w$ may be mounted on a special type-bar, if necessary, or may simply be arranged to take the place of one of the characters on one of the ordinary type-bars, as indicated in Fig. 14, especially where each type-bar has two type characters, as in the Remington machine, where the carriage is shifted to print upper-case and lower-case letters. The operation of this device is facilitated by the means for jumping the carriage along several spaces at a time, which have been hereinbefore described, although the device obviously does not depend upon such means for its successful operation, since the operator may easily depress the key carrying the type-wheel with one hand and operate the carriage release-key with the other. Furthermore, it is obvious that the wheel $w$ might be provided with a series of characters, so that in the rotation of the wheel one or more words might be printed by merely keeping the key which operates the said type-wheel depressed and moving the carriage along or allowing it to be moved.

It is not intended to limit the invention to the specific construction herein shown and described, since modifications may obviously be made without departing from the invention.

I claim—

1. In a type-writer, the combination with the platen-carriage, of a restoring device for moving said platen-carriage to its initial position, comprising a cord or flexible connecting member connected with the carriage, an actuating lever or treadle for operating the said cord to restore the carriage, and means for automatically connecting the said cord with its actuating-lever in the return movement thereof and disconnecting the same therefrom at the end of a predetermined movement, substantially as described.

2. In a type-writer, the combination with the platen-carriage, of a restoring device for moving said platen-carriage to its initial position, comprising a cord or flexible connecting member connected with the carriage, an actuating lever or treadle for operating the said cord to restore the carriage, means for automatically connecting the said cord with its actuating-lever in the return movement thereof and disconnecting the same therefrom at the end of a predetermined movement, and means for adjusting the length of said cord, substantially as described.

3. The combination with the platen-carriage, of a cord or flexible connecting member connected with said carriage, a lever for actuating said cord, an automatic latch or connecting device for connecting said cord to said lever in the return movement of said lever, and a projection adapted to engage and trip the said latch, substantially as described.

4. The combination with a platen-carriage, of a cord or flexible connecting member connected with said carriage, a lever for actuating said cord, an automatic latch or connecting device for connecting said cord to said lever in the return movement of said lever, a projection adapted to engage and trip the said latch, and means for moving said tripping projection along the path of the said latch, substantially as and for the purpose described.

5. In a type-writer, the combination with the platen-carriage provided with a step-by-step feeding device, of an arm connected with said carriage and adapted by its movement to throw the said feeding device out of gear, a cord or flexible connecting member connected with said arm and adapted to first move the same with relation to the carriage and then to move the carriage, a lever for actuating said cord, and means for automatically connecting said cord and said lever, substantially as described.

6. In a type-writer, the combination with the platen-carriage, of a cord or flexible member connected therewith, an actuating lever or treadle, means for automatically connecting said cord with said actuating-lever in the return movement thereof, and means for disconnecting the said cord from said actuating-lever, the said disconnecting means being movable so as to disconnect the cord at variable points in the travel thereof, substantially as described.

7. The combination with the platen-carriage, of a cord or flexible connecting member connected with said carriage, an actuating device for said cord, an automatic latch or connecting device for connecting the said cord with its actuating device, a projection adapted to engage and trip the said latch, a stop arranged to be moved into the path of the platen-carriage, and common means for moving the projection or tripping device for the said latch along the path of said latch and for operating the said stop to cause the same to move into the path of the carriage, substantially as described.

8. In a type-writer, the combination with the platen-carriage, of a cord or flexible connecting member connected therewith, a latching-hook secured to the end of the said cord, a treadle-lever having connected therewith an actuating device provided with a shoulder adapted to coöperate with said latch to connect said cord and said treadle-lever, a tripping device in the path of said latch to trip the same and disconnect the cord from the treadle-lever, and means for moving said tripping device in conjunction with the movement of said lever, substantially as described.

9. In a type-writer, the combination with the platen-carriage, of a cord or flexible connecting member connected therewith, a latching-hook secured to the end of the said cord, a treadle-lever having connected therewith an actuating device provided with a shoulder adapted to coöperate with said latch to connect said cord and said treadle-lever, a tripping device in the path of said latch to trip the same and disconnect the cord from the treadle-lever, means for moving said tripping device in conjunction with the movement of said lever, and an actuating-arm connected with said tripping device and having an engaging portion adjacent to but not connected with the said treadle-lever whereby the latter may be moved independently of the former or both may be moved simultaneously, substantially as described.

10. In a type-writer, the combination with the main feed-rack and feed-dogs, of a feed-dog-controlling device secured to said main feed-rack and having a surface projecting beyond the ends of the teeth thereof to engage the loose dog, and a supplemental feed-rack adapted to coöperate with the fixed dog, substantially as described.

11. In a type-writer, the combination with the main feed-rack and feed-dogs, of one or more feed-dog-controlling devices, consisting of plates secured to the main feed-rack and having surfaces projecting beyond the teeth thereof to engage the loose dog means for adjusting the position of said feed-dog-controlling devices with relation to said rack, and a supplemental rack to coöperate with the fixed dog, substantially as described.

12. In a type-writer, the combination with the paper-carriage, its feed controlling and restoring means, of a plurality of movable stops adapted to be moved into the path of said carriage, and means for automatically disconnecting the carriage from said feed-controlling devices in response to the restoring movement of said carriage after the said carriage has been moved to a position beyond the said stops whereby the said carriage is free to travel forward until arrested by one of said stops, substantially as described.

13. In a type-writer, the combination with the platen-carriage, its feed-controlling dogs and restoring means, of means for automatically disconnecting the said carriage from its feed-controlling dogs in response to the restoring movement of said carriage, said dogs being arranged to arrest the carriage after it has traveled a predetermined distance when thus disconnected, and a series of stops arranged to be separately operated in order to stop the carriage in any of a number of positions before it is automatically reconnected with the feed-dogs, substantially as described.

14. In a type-writer, the combination with the platen-carriage, its feed-controlling dogs and restoring means, of means for automatically disconnecting the said carriage from its feed-controlling dogs in response to the restoring movement of said carriage, said dogs being arranged to arrest the carriage after it has traveled a predetermined distance when thus disconnected, a series of stops arranged to be separately operated in order to stop the carriage in any of a number of positions before it is automatically reconnected with the feed-dogs, and a centering device operated by any of the key-levers for centering the carriage and permitting the proper reëngagement thereof with the feed-dogs when said carriage has been arrested by one of said stops, substantially as described.

15. In a type-writer, the combination with the platen-carriage having a forward feed movement controlled by fast and loose feed-dogs and means for producing a return movement of said carriage, of means for automatically disconnecting said carriage from said feed-dogs in response to the return movement of said carriage, a number of stops adapted to be separately moved into the path of said carriage to arrest the same in different positions when thus disconnected from the feed-dogs, means for locking the said stops in their operative position, the locking mechanism being arranged to be unlocked in response to the operation of the type-bar key-levers, substantially as described.

16. In a type-writer, the combination with the platen-carriage provided with a feed-rack, of laterally-movable feed-dogs coöperating with said feed-rack, means for lifting the said feed-rack out of engagement with the said dogs, a stop connected with the frame of the machine and arranged to be moved in response to the lifting of said feed-rack, and fixed stops arranged at intervals along said feed-rack to be engaged by the stop on the frame when thus moved, substantially as described.

17. In a type-writing machine, the combination with a release-lever for the platen-carriage, of a braking-surface fixed with relation to the machine-frame and adjacent to said release-lever, substantially as and for the purpose described.

18. In a type-writer, the combination with the main feed-rack and the feed-dogs; of a supplemental feed-rack adapted to coöperate with the fixed dog; a plate or engaging portion secured to the main feed-rack at the side thereof and projecting beyond the ends of the teeth thereof, and one or more shoulders arranged at intervals along said plates, said shoulders coinciding with certain of the feed-rack teeth, substantially as and for the purpose described.

In testimony whereof I have signed my name to this specification in the presence of two subscribing witnesses.

PAUL E. COLLINS.

Witnesses:
 HENRY J. LIVERMORE,
 JAS. J. MALONEY.